Patented Jan. 28, 1941

2,230,099

UNITED STATES PATENT OFFICE 2,230,099

AZO DYES

Frithjof Zwilgmeyer, Wilmington, Del., assignor to E. I. du Pont de Nemours & Company, Wilmington, Del., a corporation of Delaware No Drawing. Application June 13, 1939, Serial No. 278,847

2 Claims. (Cl. 260—186)

A. This invention relates to new dyes, to mixtures of organic compounds suitable for the production of dyes, and particularly to colors which are developed on the fiber. Specifically, it relates to dyes formed by the combination of diazotized 2:5-dialkoxy-aniline with coupling components suitable for the production of water-insoluble colors, particularly with coupling components such as the aryl-amides of 2:3-hydroxy-naphthoic and beta-keto-carboxylic acid. This is a continuation in part of the application identified as Zwilgmeyer, Serial No. 153,523, filed July 14, 1937 and now abandoned.

B. E. I. du Pont de Nemours and Company holds a patent covering dyes obtained by coupling aryl-diazo compounds to 4-aryl-azo-1-acetyl-amino-7-naphthol. However, the combination of diazotized 2:5-dialkoxy-aniline with those components is not specifically disclosed.

C. I have discovered that the combination of 2:5-dialkoxy-aniline with the aforementioned types of coupling components produces a color having particularly valuable properties. Particularly valuable are the colors having the formulas:

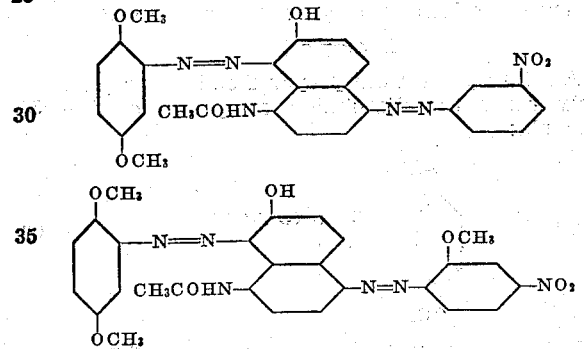

D. The most valuable objects of this invention are attained by coupling diazotized 2:5-dimethoxy-aniline with 4-aryl-azo-1-acetyl-amino-7-naphthol in substance or on the fiber by any of the various methods known to the art. These dyes are preferably applied to fibers by printing thereon a thickened solution prepared from a composition comprising a diazo-imino derivative of 2:5-dimethoxy-aniline and the coupling component in approximately equimolecular proportions and developing the color by after-treatment of the printed material with acid fumes. The dyeings so obtained possess exceptional fastness properties, particularly to washing and light.

E. This invention is more completely understood by reference to the following examples, which are illustrative and not limitative of the invention. All quantities are given in parts by weight.

Example I

A printing paste was prepared as follows: 1.7 parts of a diazoimino compound of the formula:

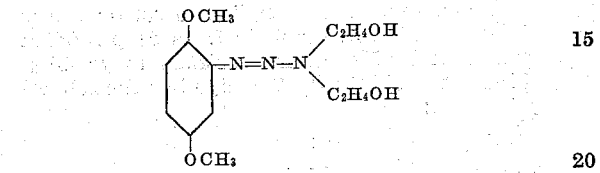

prepared by reaction of diazotized 2:5-dimethoxy-aniline with diethanolamine;

2.3 parts of 4-(3'-nitro-phenyl-azo)-1-acetyl-amino-7-naphthol of the formula:

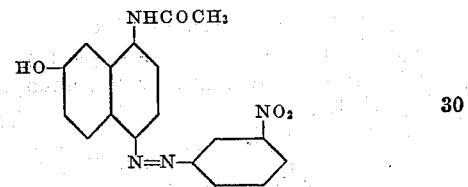

and obtained by coupling diazotized m-nitro-aniline with 1:7-amino-naphthol under acid conditions followed by acetylation;

| | Parts |
|---|---|
| Mono-ethyl ether of ethylene glycol | 4 |
| Water | 24 |
| Sodium hydroxide solution (30%) | 3 |
| Starch-tragacanth thickener, prepared according to the following formula: | 65 |
| | 100 |

| | Parts |
|---|---|
| Wheat starch | 60 |
| Water | 580 |
| 6% gum tragacanth solution | 360 |
| | 1000 |

Cotton and rayon piece goods were printed, by means of an engraved roller, with the above paste. The printed fabric was air dried and then subjected to the action of live steam containing acetic acid vapors in the conventional acid ager. Color development occurred during this process and the dyed fabrics then were rinsed, soaped and again rinsed and dried. A deep reddish brown shade of exceptionally good fastness to washing and light was obtained. The dye has the following formula:

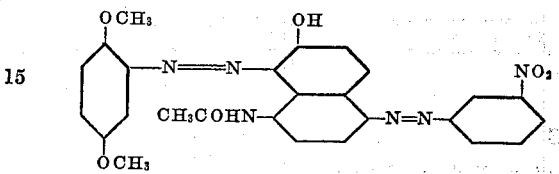

Example II

A printing paste was prepared according to the formula of Example I, except that 4-(4'-nitro-2'-methoxy-phenyl-azo)-1-acetyl-amino-7-naphthol was substituted for the 4-(3'-nitro-phenyl-azo)-derivative. This coupling component has the structure

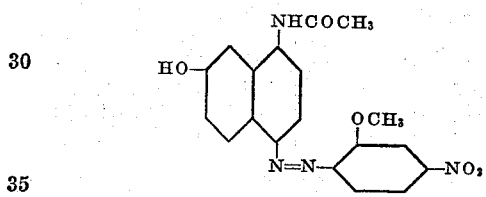

and is prepared by coupling diazotized 5-nitro-2-amino-anisole with 1:7-amino-naphthol under acid conditions followed by acetylation.

This composition was applied to cotton fabric and developed as in Example I. A deep reddish brown dyeing of excellent fastness to washing and light was obtained. The dye has the following formula:

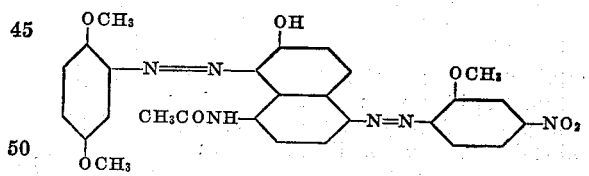

Example III

A printing paste comprising the following: 2 parts of a diazoimino compound of the formula:

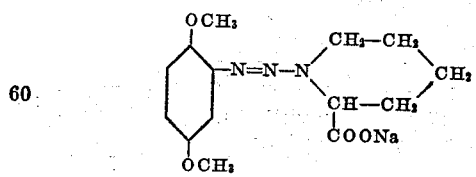

prepared by the reaction of diazotized 2:5-dimethoxy aniline with piperidine-alpha-carboxylic acid; 2 parts of a coupling component of the formula:

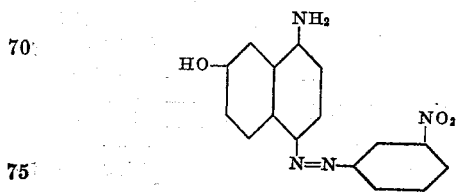

| | Parts |
|---|---|
| Mono-ethyl ether of ethylene glycol | 4 |
| Water | 24 |
| 30% sodium hydroxide solution | 3 |
| Starch-tragacanth thickener | 65 |
| | 100 |

Cotton piece goods were printed with the above paste and the color developed by treating the printed material with steam and acid fumes. A deep blackish brown dyeing of excellent fastness properties was obtained.

Example IV

A printing paste was prepared by the formula given in Example III except that a diazoimino derivative of the formula:

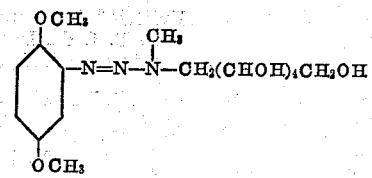

prepared by the reaction of diazotized 2:5-dimethoxy-aniline with methyl glucamine, was substituted for the piperidine-alpha-carboxylic acid derivative.

This composition was printed on cotton fabric and the color developed as in Example III. The dyeing obtained was identical with that of Example III.

Example V

A printing paste was prepared by the formula given in Example III, except that a coupling component of the formula:

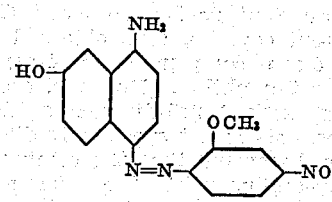

was substituted for the coupling component of that example.

Cotton material was printed and the color developed as in Example III. A dark brown dyeing of excellent fastness properties was obtained.

Example VI

A printing paste was prepared as in Example I only using the diazoimino compound of the formula:

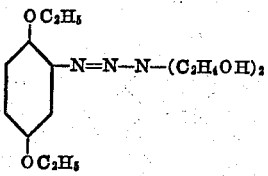

F. The above examples are illustrative of usual methods of applying these dyes. They find their most important use in printing where the stabilized diazo component in mixture with the coupling component is printed on the fiber and developed by hydrolysis of the diazoimino compound. Obviously these color combinations can be prepared in substance as well as on the fiber in which case they may be utilized as pigments or they may be temporarily solubilized, applied to the fiber, and desolubilized thereon. Other alkoxy amines in addition to those disclosed can be used.

G. According to this invention new azoic colors of exceptional shades and fastness properties may be produced from readily available intermediates.

H. As many apparently widely different embodiments of this invention may be made without departing from the spirit and scope thereof, it is to be understood that I do not limit myself to the specific embodiments thereof except as defined in the appended claims.

I claim:
1. The compound represented by the formula:

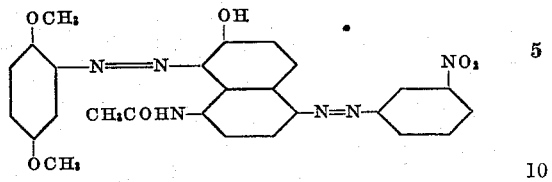

2. Fibers dyed with the compound of claim 1.

FRITHJOF ZWILGMEYER.